INVENTORS
M. BUDZICH
L. J. ROZANKOWSKI
BY S. Gundersen
ATTORNEY

FIG. 3

INVENTORS
M. BUDZICH
L. J. ROZANKOWSKI
BY S. Gundersen
ATTORNEY

March 24, 1964  M. BUDZICH ETAL  3,125,781
APPARATUS FOR INJECTION MOLDING OF PLUGS
Filed July 19, 1962   6 Sheets-Sheet 4

INVENTORS
M. BUDZICH
L. J. ROZANKOWSKI
BY *S. Gundersen*
ATTORNEY

March 24, 1964 M. BUDZICH ETAL 3,125,781
APPARATUS FOR INJECTION MOLDING OF PLUGS
Filed July 19, 1962 6 Sheets-Sheet 5

INVENTORS
M. BUDZICH
L. J. ROZANKOWSKI
BY S. Gundersen
ATTORNEY

March 24, 1964   M. BUDZICH ETAL   3,125,781
APPARATUS FOR INJECTION MOLDING OF PLUGS
Filed July 19, 1962   6 Sheets-Sheet 6

INVENTORS
M. BUDZICH
L. J. ROZANKOWSKI
BY S. Gundersen
ATTORNEY

United States Patent Office 3,125,781
Patented Mar. 24, 1964

3,125,781
APPARATUS FOR INJECTION MOLDING OF PLUGS
Mieczyslaw Budzich, Dundalk, and Leon J. Rozankowski, Towson, Md., assignors to Western Electric Company, Incorporated, New York, N.Y., a corporation of New York
Filed July 19, 1962, Ser. No. 210,983
5 Claims. (Cl. 18—5)

This invention relates to apparatus for injection molding of plugs and particularly to an apparatus for injecting a plasticized material into a mold for subsequently insulating a plurality of parts which form a plug assembly.

An object of this invention is to provide a new and improved apparatus for automatically injection molding an insulation about various elements of a plug.

Another object of the invention is to provide apparatus for positioning and clamping a plug relative to an injection molding press for subsequent injection molding of an insulation material into the plug.

With these and other objects in view, the present invention contemplates a carriage having a nest for receiving a plurality of plug elements held in a spaced relation by a mold assembly. The carriage is positioned adjacent to an injection molding apparatus wherein the plug elements and the mold are clamped. A predetermined quantity of granular plastic material is automatically fed into a heat chamber, plasticized and subsequently injected into the mold assembly to provide an insulating material in the spaces between the plug elements.

These and other objects and advantages of the invention will be apparent from the following detailed description of the fixture embodying the invention when read in conjunction with the drawings, in which.

Figure 1:
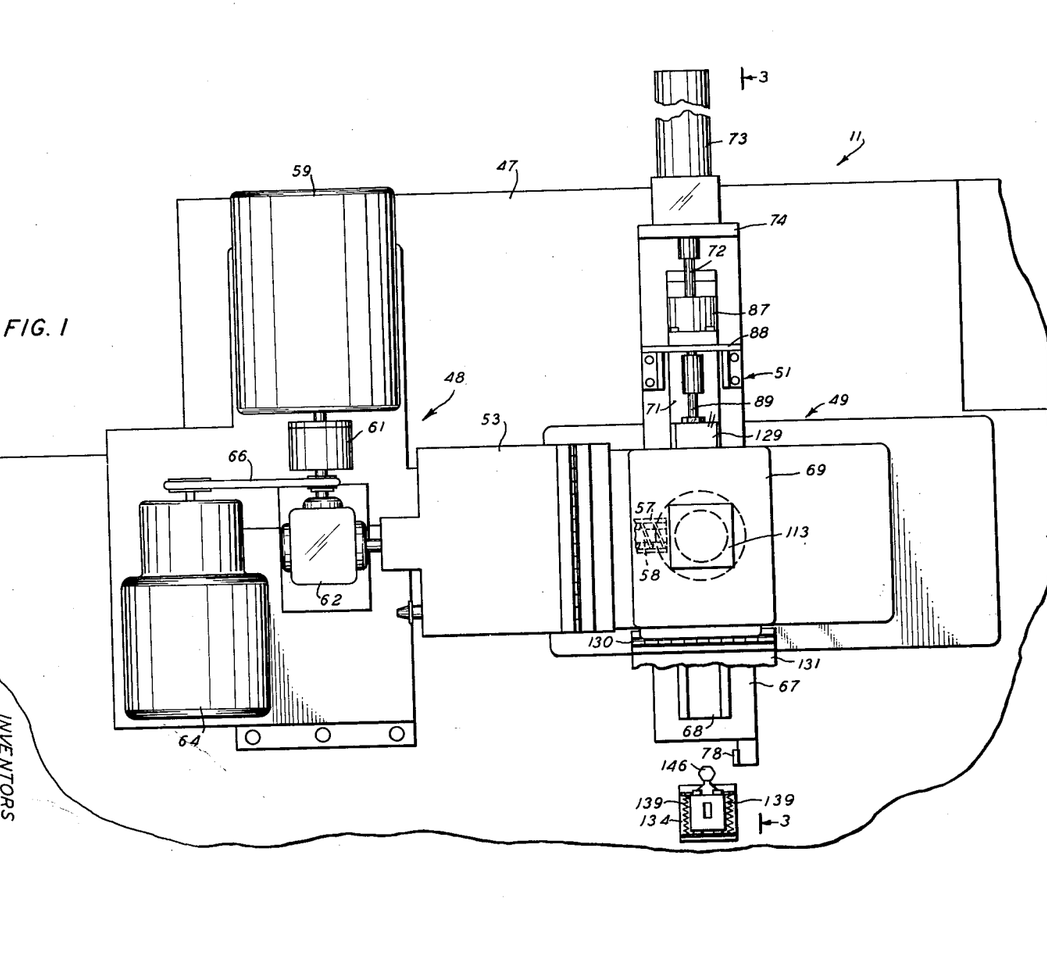
FIG. 1 is a plan view of an injection molding apparatus for injecting an insulating material between a plurality of elements which form a plug.
Figure 11:
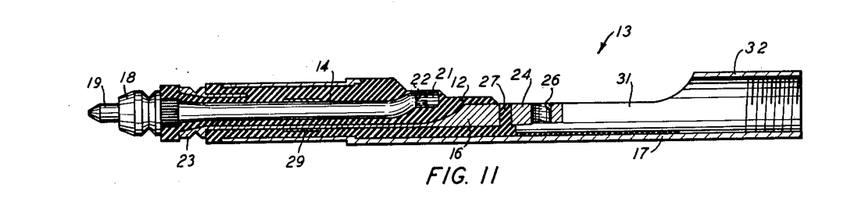
FIG. 11 is a sectional view showing the completed plug.

Referring now to FIG. 1, an injection molding device, designated generally by the numeral 11, injects a plasticized insulation material 12, such as nylon, between the plurality of prearranged elements of a cylindrically shaped article such as a switchboard plug, generally designated by the numeral 13 (FIG. 11).

Figure 9:
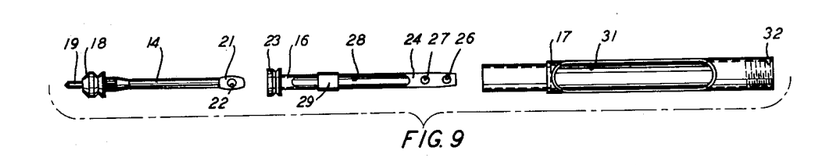
FIG. 9 is an exploded view showing the elements of the plug.

As shown in FIG. 9, the elements of the plug 13 consist of a center pin 14, an inner sleeve 16 and an outer sleeve or shell 17. The center pin 14 is provided with an enlarged shoulder 18 and a tip 19 at one end thereof, and a flat portion 21 having a threaded aperture 22 at the opposite end thereof. The inner sleeve 16 is formed with a shoulder or ring 23 at one end thereof and is flattened on one side 24 at the opposite end thereof. In addition, the inner sleeve 16 is provided with a threaded aperture 26 and an aperture 27 in the flat portion 24, and a cutaway 28 intermediate the ends thereof. To facilitate the subsequent positioning of the pin 14 within the sleeve 16, a plastic ring 29 is positioned about the sleeve 16 and over the cutaway 28. The outer sleeve 17 is formed with a cutaway 31 intermediate the ends thereof to expose partially the bore formed by the sleeve. In addition, the bore of the sleeve 17 is threaded at one end 32 thereof.

Figure 10:
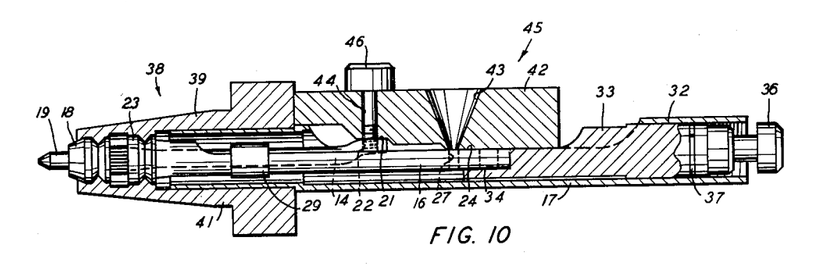
FIG. 10 is a sectional view showing a preassembled unit having molds positioned about the elements of the plug prior to the injection of the insulation material.

As viewed in FIG. 10, a core pin or insert 33, having a stepped shoulder 34 at one end thereof and a circumferential shoulder or head 36 at the opposite end thereof is inserted into the threaded end 32 of the outer sleeve 17. It is to be noted that the core pin 33 is provided with a circumferential groove intermediate the ends thereof for receiving a split spring 37 to facilitate the retention of the core pin within the sleeve 17. The center pin 19 is inserted within the inner sleeve 16 to a position substantially as shown in FIG. 10. The assembly of the pin 14 and the sleeve 16 is inserted into the open end of the outer sleeve 17 whereupon the flat end 24 of the sleeve 16 engages the stepped shoulder 34 of the core pin 33, thereby limiting further movement of the assembly. A tip mold 38, consisting of a pair of identical and opposed hinged members 39 and 41, is positioned about the tip end of the completed assembly, thereby enclosing portions of the shoulder 18, the ring 23 and the sleeve 17. A center mold 42, having a funnel-shaped aperture 43 and an aperture 44, is positioned within the cutaway 31 of the sleeve 17 and engages the flat portion 24 of the inner sleeve 16. A headed fastening member 46 is positioned within the aperture 44 and is threadedly fastened within the threaded aperture 22 of the center pin 14 to provide a completed preassembled unit or plug-mold assembly 45, as viewed in FIG. 10. It is to be noted that the funnel-shaped aperture 43 of the center mold 42 is positioned over the aperture 27 formed in the flat portion 24 of the inner sleeve 16. In this manner, the elements of the plug 13 and the molds 38 and 42 are positioned for subsequent insertion or injection of the insulating material 12 between the elements.

Figure 2:
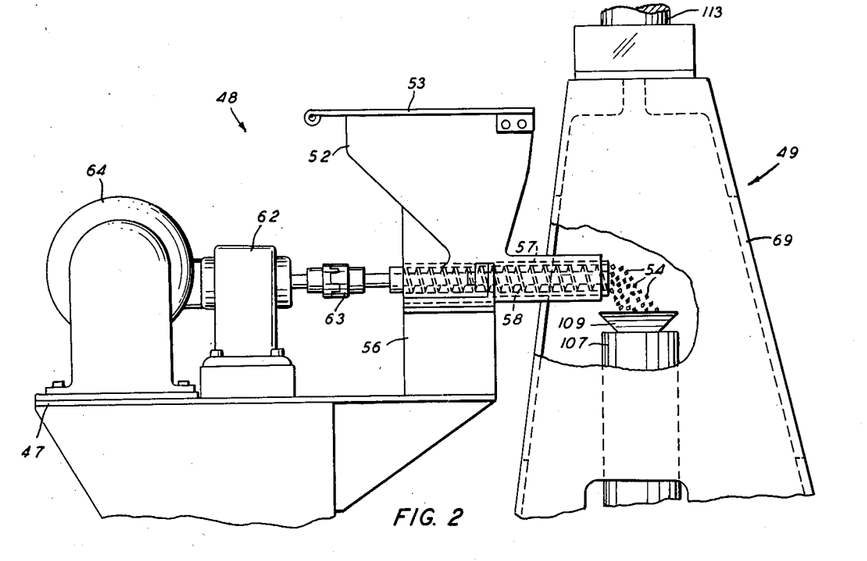
FIG. 2 is a partial front view showing the feeding of the insulation material into an injector.

As shown in FIGS. 1 and 2, the injection molding device 11 is positioned on a support 47 and consists generally of a feeding system 48, an injector 49, such as an injection molding machine sold under the trademark "Mini-Jector," and a carriage 51. The feed system 48 is provided with a hopper 52 having a cover 53 for receiving granulated plastic material 54 wherein the hopper 52 is supported on a pedestal 56. As viewed in FIG. 2, the granular material 54 is fed from the hopper 52 into a cylinder 57 which has a screw 58 positioned therein. A continuously operated drive motor 59 is coupled through a magnetic clutch-brake 61 to a reduction gear arrangement 62. A coupling unit 63 connects the screw 58 to the reduction gear arrangement 62 where, upon energization of the clutch-brake 61, the screw 58 is rotated to urge plastic granules 54 through the cylinder 57 and into the injector 49. A rotation counter 64 is mechanically connected to the input shaft of the reduction gear arrangement 62 by a belt system 66 to count the number of revolutions of the input shaft of the reduction gear 62. The counter 64 can be preset to deactivate the magnetic clutch-brake 61 upon a predetermined number of revolutions of the input shaft of the reduction gear 62, thereby controlling the amount of granular material 54 fed into the injector 49.

Figure 3:
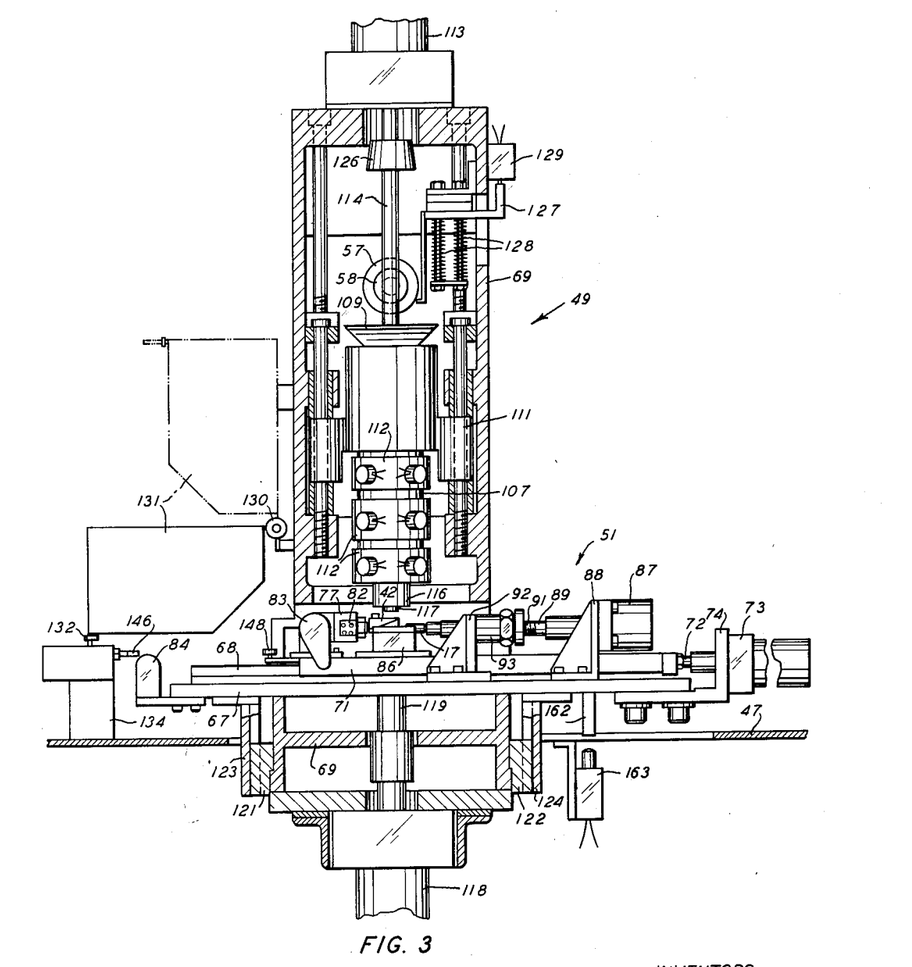
FIG. 3 is a sectional view taken along line 3—3 of FIG. 1 showing the relationship between the injector and a carriage for positioning the elements of the plug beneath the injector.
Figure 5:
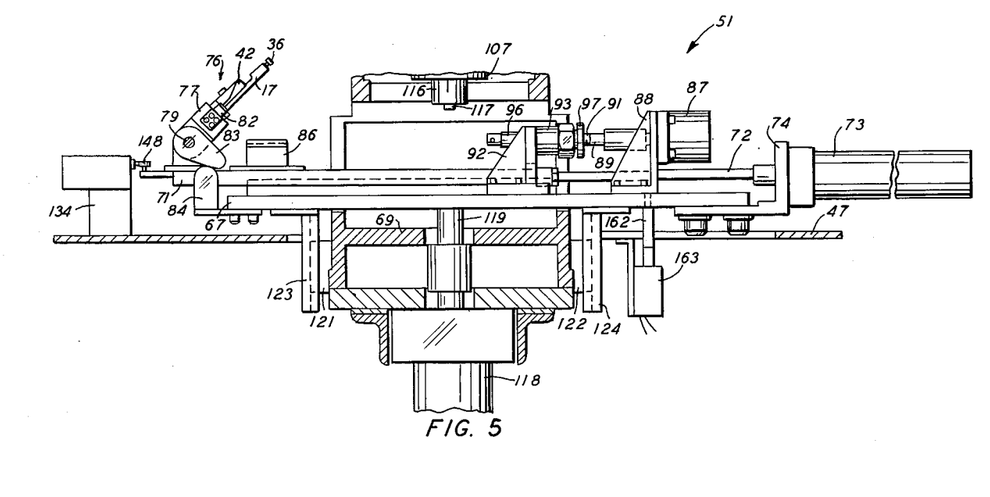
FIG. 5 is a partial side view showing details of the carriage for supporting and carrying the elements of the plug to a position beneath the injector.
Figure 6:
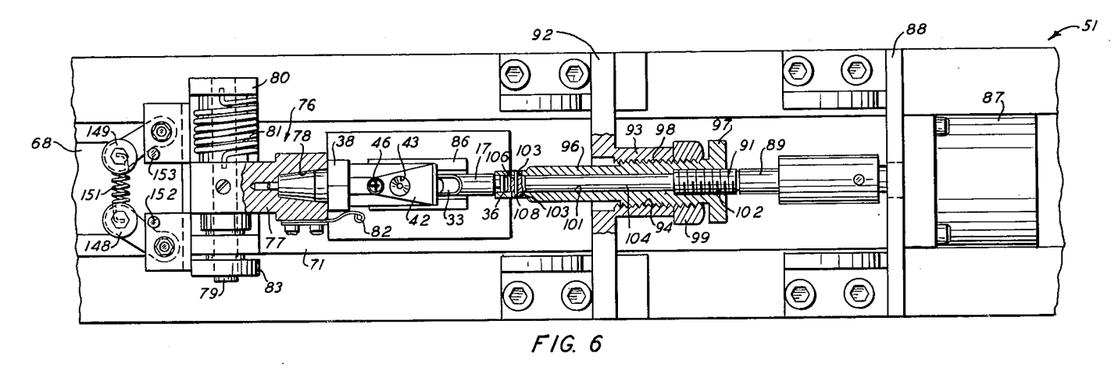
FIG. 6 is a partial plan view with parts broken away showing a mechanism for clamping the plug prior to the injection molding.

As shown in FIGS. 1, 3 and 5, the carriage 51 is supported in an upright frame 69 and is provided with a horizontal base 67 for supporting a dovetail section 68. Positioned slidably on the dovetail 68 is a slide 71 which is connected at one end thereof to a piston rod 72 of an air cylinder 73 fixedly mounted to the horizontal base 67 by a bracket 74. A nest 76, as shown in FIGS. 3 and 5, and in detail in FIG. 6, is provided with a pivotally mounted arm 77 having an opening 78 which conforms substantially to the shape of the tip mold 38 and is adapted for reception thereof. The arm 77 is pivotally mounted to a pin 79 which is rotatably supported in a bracket 80 positioned on one end of the slide 71. In addition, a torsion spring 81 is coaxially positioned about the pin 79 and is fastened at one end thereof to the bracket 80 and at the opposite end thereof to the arm 77 thereby urging the arm in a clockwise rotation as viewed in FIGS. 3 and 5. A retainer spring 82 is fastened to the arm 77 and provides sufficient force upon the tip mold 38 to retain the plug-mold assembly 45 within the opening 78 and to maintain the mold 42 and the plug-mold assembly in a proper position for the subsequent injection of the insulation material. In addition, an arm 83 is fastened to the pin 79 and engages a striker plate 84 as the slide is moved to the left, as viewed in FIGS. 3 and 5, to pivot the nest 76 into a position as shown in FIG. 5 to facilitate the insertion of the plug-mold assembly 45 into the nest 76. A rest 86 is positioned on the slide 71 to support the plug-mold assembly 45 as the nest 76 is pivoted in a clockwise direction and cooperates with the torsion spring 81 to maintain the assembly 45 in a substantially horizontal position which is the transfer position for the assembly.

A pneumatically driven rotary member 87 (FIGS. 3, 5 and 6) is fastened to an upright bracket 88 which is positioned on the support 67 wherein the bracket 88 is provided with an opening to allow the passage of piston rod 72. A rod 89 is coupled to the rotary member 87 and is provided with a threaded portion 91 at one end thereof which is rotated upon the actuation of the pneumatically driven rotary member 87. A second bracket 92 is mounted upon the support 67 and is provided with a hub 93 having a threaded bore 94. A sleeve or cylinder 96, having a head 97 and an outer threaded portion 98, is threadedly mounted within the bore 94. In addition, a large nut 99 is threadedly positioned between the hub 93 and the head 97 to lock the sleeve 96 in a desired position relative to the bracket 92 and the injector 49. The sleeve 96 is provided with a bore 101 which is threaded at one end 102 and is formed with a pair of diametrically opposed slots 103 at the opposite end. The threaded portion 91 of the rod 89 is positioned within the threaded portion 102 of the bore 101 and engages a rod 104 which is positioned slidably within the bore 101 for sliding movement therein. In addition, a circular slug 106 is slidably positioned within the bore 101 and is provided with an aperture which is aligned with the slots 103 for the reception of a pin 108, thereby limiting movement of the slug 106 within the bore 101. In addition, any rotary motion which is coupled to the slug 106 through the rotating rod 89 and the rod 104 is limited by the slot 103 and pin 108 arrangement. Thus, it is easily seen that upon the actuation of the rotary member 87, the threaded portion 91 of the rod 89 is rotated to engage and slide the rod 104 within the bore 101 whereupon the rod 104 engages and slidably urges the slug 106 within the bore 101.

Figure 4:
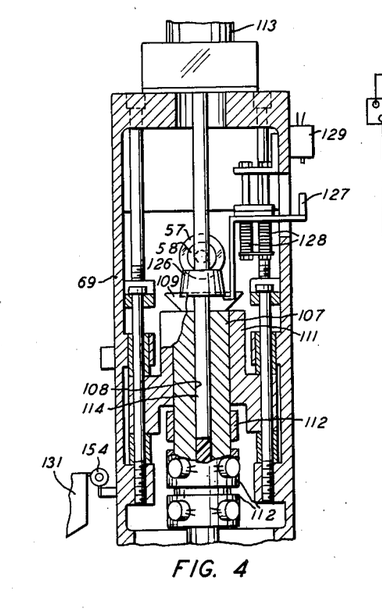
FIG. 4 is a partial view of FIG. 3 showing the injector in an operative position.

The injector 49 is positioned above the carriage 51 and adjacent to the feeding mechanism 48 and is provided with a cylinder 107 having a bore 108 (FIGS. 2, 3 and 4) for receiving the granulated plastic material 54. The cylinder 107 is provided with a funnel 109 and is mounted in a support 111 which is fastened to a plurality of bolts supported in the frame 69. In addition, a series of electrically controlled heating elements 112 are positioned about the lower portion of the cylinder 107 which serves as a heat chamber to heat and plasticize the granulated material 54 for subsequent injection of the material into the plug-mold assembly 45. A hydraulic cylinder 113 is positioned atop the frame 69 and is connected to a ram 114 which is utilized to urge the insulating material through the bore 108 of the cylinder 107. The cylinder 107 is provided with a base outlet 116 which has a valve arrangement whereby a nozzle 117 must be inserted upwardly into the base outlet 116 to allow the plasticized material to flow from the cylinder 107 and injected into the plug-mold assembly 45. To facilitate the upward movement of the nozzle 117 into the base outlet 116, a hydraulic cylinder 118 is mounted beneath the frame 69 and is coupled to an extension 119 which is mounted on the underside of the horizontal base 67. A pair of dovetails 121 and 122 are mounted on the frame 69 and guide slidably a pair of support members 123 and 124, respectively, which are mounted on the underside of the horizontal base 67. The ram 114 is provided with an enlarged annulus 126 which is positioned to engage a stepped crossbar 127. The crossbar 127 is resiliently mounted to the frame 69 by compression springs 128 and is positioned to normally engage a switch 129 which is connected in a control circuit (not shown) for the magnetic clutch-brake 61. As viewed in FIG. 4, the annulus 126 resiliently moves the member 127 from engagement with the switch 129, thereby actuating the magnetic clutch-brake 61 and the counter 64 so that a predetermined amount of the granular material 54 is fed through the cylinder 57 and into the cylinder 107 after the ram 114 has been retracted from within the cylindrical bore 108.

Figure 7:
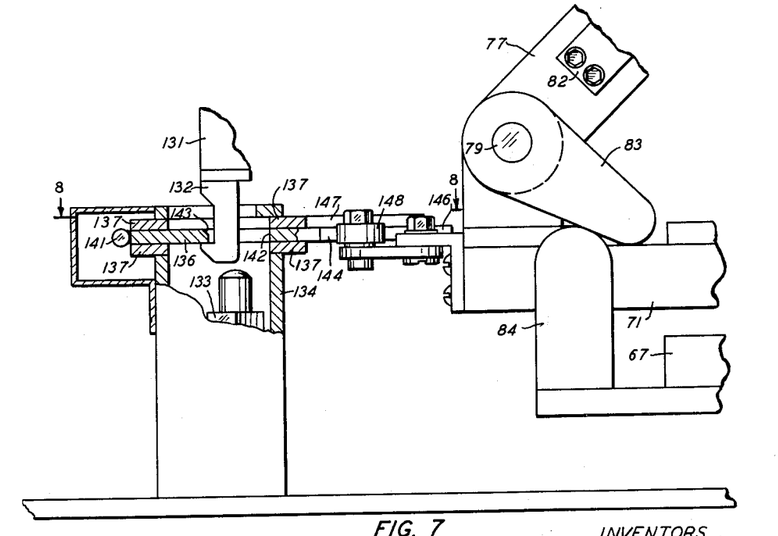
FIG. 7 is a partial side view showing details of a safety cover latch mechanism which is controlled by movement of the carriage.
Figure 8:
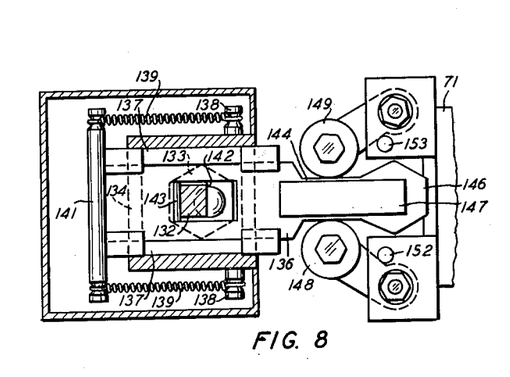
FIG. 8 is a sectional view taken along line 8—8 of FIG. 7 showing elements of the latch mechanism.

A safety cover or shield 131 is pivotally connected to the frame 69 and is further provided with a projecting hook 132. A spring hinge 130 provides the pivotal connection for the cover 131 and normally retains the cover in an up position as shown in phantom lines in FIG. 3. A switch 133 is positioned within a housing 134 and in the path of the hook 132 so that upon pivotal movement of the cover 131, the hook 132 engages and actuates the switch 133 to initiate the operation of the injection-molding process. As shown in FIGS. 7 and 8, a latch mechanism is provided within the housing 134 wherein a slide 136 is slidably positioned between two pairs of guide plates 137. A pair of posts 138 are fixedly mounted to the housing 134 and each support one end of a pair of springs 139 where the opposite ends of the springs are fastened to a pin 141 which is secured to the one end of the slide 136. The slide 136 is provided with an aperture 142 having a beveled surface 143 and is positioned for reception of the hook 132 therethrough, where, upon pivotal movement of the cover 131, the hook 132 engages the beveled surface 143, thereby urging the slide 136 to the left, as shown in FIG. 8, against the biasing action of the springs 139, and subsequently permitting the hook to be urged through the aperture 142 into actuating engagement with the switch 133. As the hook 132 passes through the aperture 142, the biasing action of the springs 139 urges the slide to the right as shown in FIG. 8, thereby latching or locking the hook under the slide 136 to retain the cover 131 in a down position during the injection-molding process. The slide 136 is provided with an extension 144 having an enlarged head 146 with a block 147 mounted on the upper surface thereof. A pair of rollers 148 and 149 are pivotally mounted to the slide 71 and are urged together by a tension spring 151 as shown in FIG. 6. During the period when the slide 71 is positioned to the left as shown in FIG. 5, the rollers 148 and 149 assume a position about the extension 144 as viewed in FIG. 8. As the hook 132 operates the switch 133, the slide 71 moves to the right (FIGS. 3 and 5) whereupon the rollers 148 and 149 engage the enlarged head 146 of the slide 136 to aid in the urging of the slide 136 over the hook 132, thereby retaining the cover 131 in a down position. Upon continued movement of the slide 71 to the right, the rollers 148 and 149 are urged over the enlarged head 146 against the biasing action of the spring 151 and subsequently returned to a normal rest position against the pair of stop pins 152 and 153, respectively, as shown in FIG. 6. Upon completion of the injection-molding process, the slide 71 is moved to the left as viewed in FIGS. 3 and 5, whereupon the rollers 148 and 149 engage the head 146, thereby urging the slide 136 to the left and releasing the hook from the slide 136 so that the cover 131 returns to the normal up position, as shown in phantom lines of FIG. 3, by the action of the spring hinge 130. It is to be noted that the block 147 engages the housing 134 to limit the leftward movement of the slide 136 whereupon the rollers 148 and 149 are urged over the head 146 to assume a normal rest position about the extension 144 (FIG. 8).

*Operation*

Figure 12:
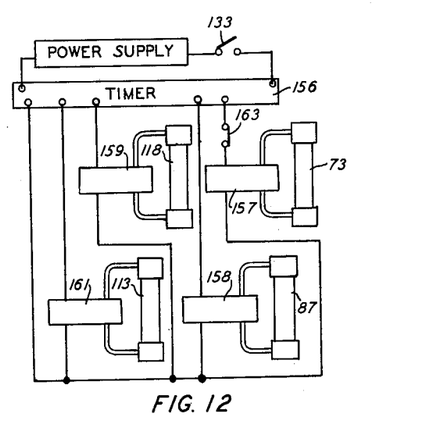
FIG. 12 is a schematic diagram of an electrical circuit for sequentially controlling the operation of the injection process.

In the operation of the apparatus described herein, an operator manually positions and fastens the tip mold 38 and the center mold 42 to the assembled units of plug 13 as shown in FIG. 10. In addition, the core pin or insert 33, is inserted into the end 32 of the sleeve 17 so that the flat end 24 of the inner sleeve 16 engages the shoulder 34 of the finger 33 and the head 36 extends outwardly from the sleeve 17. The plug-mold assembly 45 is inserted into the opening 78 of the nest 76 which is in a loading position during the period when the slide 71 is in a normal loading station to the left as shown in FIG. 5. The operator pivotally moves the cover 131 into engagement with the latch mechanism, as previously described, and actuates the switch 133 whereupon a timing device 156 (FIG. 12) sequentially initiates the automatic operation by actuating a solenoid valve 157 to pneumatically operate the air cylinder 73 thereby moving the slide 71 to the right as shown in FIG. 3 and pivoting the nest 76 into the transfer position. As shown in FIG. 6, the slide 71 is positioned so that the head 36 of the core pin 33 is inserted into the open end of the bore 101 and the end 32 of the sleeve 17 engages and abuts the end of the sleeve 96. The timer 156 thereafter actuates a solenoid valve 158 to operate the rotary member 87 to rotate the threaded portion 91 of the rod 89, thereby sliding the rod 104 and the slug 106 through the bore 101 of the sleeve 96 so that the slug 106 engages the head 36, thus providing sufficient pressure upon the core pin 33 to retain the guide finger within the plug-mold assembly 45 and clamp the assembly between the nest 76 and the sleeve 96 during the injection-molding process. Further, the pressure applied upon the core pin 33 through the slug 106 is sufficient to rigidly position the core pin 33 within the sleeve 17 and precludes the insulation material from flowing from the end 32 of the sleeve 17 under the pressure of the injection molding process. It is to be noted that the arrangement of the pin 108 extending through the slug 106 and into the slots 103 restricts any rotary movement of slug 106 which may be coupled through the rod 104 from the rotating rod 89. Therefore, the slug 106 provides only axially aligned pressure upon the protruding head 36 and the plug-mold assembly 45 so that the funnel 43 maintains a properly aligned position with respect to the nozzle 117.

The hydraulic cylinder 118 is operated through the actuation of a solenoid 159 by the timer 156 to vertically lift the horizontal base 67 so that the funnel aperture 43 of the center mold 42 engages the nozzle 117 and thereafter urges the nozzle 117 into the base outlet 116 so that the plasticized material is subsequently allowed to flow into and within the tip mold 38 and the center mold 42 and between the elements 14, 16 and 17 which form the plug 13, thereby providing the insulation material 12 between the elements of the plug. A predetermined amount of granular material 54 is fed from the hopper 52 through the cylinder 57 and into the heat chamber of the bore 108 of the cylinder 107 which is surrounded by the heating elements 112 wherein the granular material 54 is thereafter heated and plasticized. The timer 156 actuates a solenoid valve 161 whereby the hydraulic cylinder 113 is operated to provide a down stroke of the ram 114, thereby forcing the plasticized material into the plug-mold assembly 45. It is to be noted that upon the downward stroke of the ram 114, the annulus 126 engages the crossbar 127 to operate the switch 129, thereby actuating the feeding system 48, as previously described, to feed a predetermined amount of granular material 54 into the cylinder 107. After a predetermined period, the hydraulic cylinder 113 is deactivated to retract the ram 114 from within the cylinder 107. The hydraulic cylinder 118 is deactivated to lower the horizontal base thereby allowing the nozzle 117 to project downwardly from the base outlet 116, preventing further flow of plasticized material therefrom. As the horizontal base 67 continues in a downward movement, a pin 162, projecting from the underside thereof, engages and actuates a switch 163 to condition the control circuit for the air cylinder 73 where, upon subsequent actuation by the timer 156, the air cylinder 73 is actuated to move the slide 71 to the left as viewed in FIGS. 3 and 5. As the slide 71 moves to the left, the arm 77 contacts the striker plate 84 and pivots the nest 76 upwardly to a position as shown in FIG. 5. In addition, the rollers 148 and 149 engage the enlarged head 146 to actuate the latch mechanism, as previously described, thereby automatically releasing the cover 131 to indicate the completion of the injection-molding process whereupon the operator removes the completed product 13.

It is to be understood that the above-described arrangements are illustrative of the principles of the invention. Numerous other arrangements may be devised by those skilled in the art without departing from the spirit and scope of the invention.

What is claimed is:

1. Apparatus for clamping and positioning a preassembled unit having a mold clamped to one end of a plurality of plug elements and a core pin protruding from the other end of the unit for subsequent injection of an insulation material from an injector into the mold and between the plug elements, which comprises:
   a nest for receiving the mold end of the preassembled unit,
   means for normally urging and supporting the nested unit for subsequent injection of material therein,
   means spaced from and aligned with the nested unit for receiving the protruding core pin,
   means for relatively moving the nest and the receiving means with the protruding core pin inserted into the receiving means,
   means within the receiving means for clamping the preassembled unit between the nest and the receiving means to positively position the core pin, and
   means for moving the clamped unit into engagement with the injector for injection of the insulation material into the mold and between the plug elements.

2. Apparatus for clamping and positioning a preassembled unit having a mold clamped to one end of a plurality of plug elements and a core pin protruding from the other end of the unit for subsequent injection of an insulation material from an injector into the mold and between the plug elements, which comprises:
   a support,
   a carriage positioned at a normal loading station,
   means on the carriage for supporting the preassembled unit,
   means for engaging and clamping the unit upon movement of the carriage, a cover pivotally mounted on the support to shield the carriage upon movement thereof, a hook mounted in a protruding fashion on the cover for pivotal movement with the cover, means on the support in the pivotal path of the hook for receiving the hook and locking the hook and the cover upon pivotal movement of the cover, means responsive to the movement of the hook for moving the carirage to sequentially clamp and position the unit adjacent to the injector, inject the insulation material into the mold and between the plug elements and return the carriage to the normal rest station, and means mounted on the carriage for engaging the hook and cover locking means upon the return of the carriage to the normal loading station to release the cover thereby revealing the molded product.

3. Apparatus for clamping and positioning a preassembled unit having a mold clamped to one end of a plurality of plug elements and a core pin protruding from a shell end of the plug elements for subsequent injection of an insulation material from an injector into the mold and between the plug elements, which comprises:

a carriage, a nest pivotally mounted on the carriage for receiving the mold end of the preassembled unit, means for normally urging the nest to a transfer position for the subsequent injection process, means for retaining the nest in a loading position at a normal loading station to facilitate the insertion of the mold end of the preassembled unit into the nest, a sleeve spaced from and axially aligned with the transfer position of the shell end of the preassembled unit, a rod slidably positioned within the sleeve, means for moving the carriage towards the sleeve with the urging means pivoting the nest to the transfer position so that the shell end of the preassembled unit abuts the sleeve and the protruding core pin is inserted into the sleeve, and means for sliding the rod within the sleeve and into engagement with the protruding core pin so that the preassembled unit is clamped between the nest and the sleeve to positively position the core pin and is positioned adjacent to the injector for injection of the insulation material into the mold and between the plug elements.

4. Apparatus for clamping and positioning a preassembled unit having a mold clamped to one end of a plurality of plug elements and a core pin protruding from the other end of the unit for subsequent injection of an insulation material from an injector into the mold and between the plug elements, which comprises:

a support, a carriage positioned at a normal loading station, means on the carriage for supporting the preassembled unit, means for engaging and clamping the unit upon movement of the carriage, a cover pivotally mounted on the support to shield the carriage upon movement thereof, a hook mounted in a protruding fashion on the cover for pivotal movement with the cover, a slide mounted in the support in alignment with the path of movement of the carriage and having an enlarged head extended towards the carriage, a pair of springs fastened between the slide and the support for normally biasing the slide towards the carriage, the slide formed with an aperture substantially in alignment with the pivotal movement of the hook where the hook engages and urges the slide away from the carriage against the biasing action of the springs so that the hook passes through the aperture and the slide resiliently moves towards the carriage by the biasing action of the springs to lock the hook within the slide, a pair of rollers pivotally mounted on the carriage and resiliently urged towards each other, the rollers assuming an encompassing position about the enlarged head of the slide when the carriage is at a normal rest station, and means responsive to the movement of the hook for moving the carriage to sequentially clamp and position the unit adjacent to the injector, inject the insulation material into the mold and between the plug elements and return the carriage to the normal rest station with the rollers engaging the head to urge the slide away from the carriage against the biasing action of the springs and release the hook and cover to reveal the molded product whereby the rollers are subsequently urged over the enlarged head so that the slide is resiliently urged towards the carriage by the biasing of the springs and the aperture assumes the position in alignment with the pivotal path of the hood.

5. Apparatus for clamping and positioning a preassembled unit having a mold clamped to one end of a plurality of plug elements and a core pin protruding from a shell end of the plug elements for subsequent injection of an insulation material from an injector into the mold and between the plug elements, which comprises:

a support, a carriage mounted for reciprocation on the support, a nest pivotally mounted on the carriage for receiving the mold end of the preassembled unit at a normal loading station, a rest mounted on the carriage for supporting an intermediate portion of the preassembled unit in a transfer position, a torsion spring for normally urging the nest into the rest, a striker plate mounted on the support adjacent to the normal loading station of the nest, an arm mounted for pivotal movement with the nest positioned for engagement with the striker plate at the normal loading station so that the nest is pivoted to a loading position at the normal loading station to facilitate the insertion and removal of the preassembled unit in the nest, a sleeve mounted on the support spaced from and axially aligned with the transfer position of the shell end of the preassembled unit, a rod positioned for slidable movement within the sleeve, a threaded member supported within one end of the sleeve for rotational and axial movement therein for subsequent engagement with the rod, a slug having an aperture therethrough positioned slidably within the open end of the sleeve, the sleeve formed with a pair of diametrically opposed longitudinal slots in the area for receiving the slug and aligned with the aperture of the slug, a pin positioned within the slug aperture and extending at each end into the slots to limit the axial movement and restrict any rotational movement of the slug within the sleeve, means for moving the carriage from the normal loading station towards the sleeve with the nest pivoting the preassembled unit from the loading position to the transfer position on the rest so that the shell end subsequently abuts the open end of the sleeve and the protruding core pin is inserted into the sleeve, means for rotating and axially moving the threaded member within the sleeve with the member engaging and pushing the rod into engagement with the slug so that the preassembled unit is clamped between the nest and the sleeve to positively position the core pin, means for moving the support with the carriage and the clamped preassembled unit towards the injector so that the mold engages the injector, means for actuating the injector to inject the insulation material into the mold and between the plug elements, and means for sequentially controlling the carriage moving means, the threaded member rotating means, the support moving means and the injector actuating means to serially clamp, position and inject the insulation material into the preassembled unit and to return the molded product to the normal loading station so that the arm engages the striker plate to pivot the nest to the substantially loading position to facilitate the removal of the product.

References Cited in the file of this patent

UNITED STATES PATENTS 2,428,275  Frankwich et al. _________ Sept. 30, 1947

FOREIGN PATENTS 451,726  Canada _______________ Oct. 5, 1948
570,536  Canada _______________ Feb. 10, 1959